Franklin I. Sage's Coffee & Tea Pot.
Case A
117210  Fig. 1  PATENTED JUL 18 1871
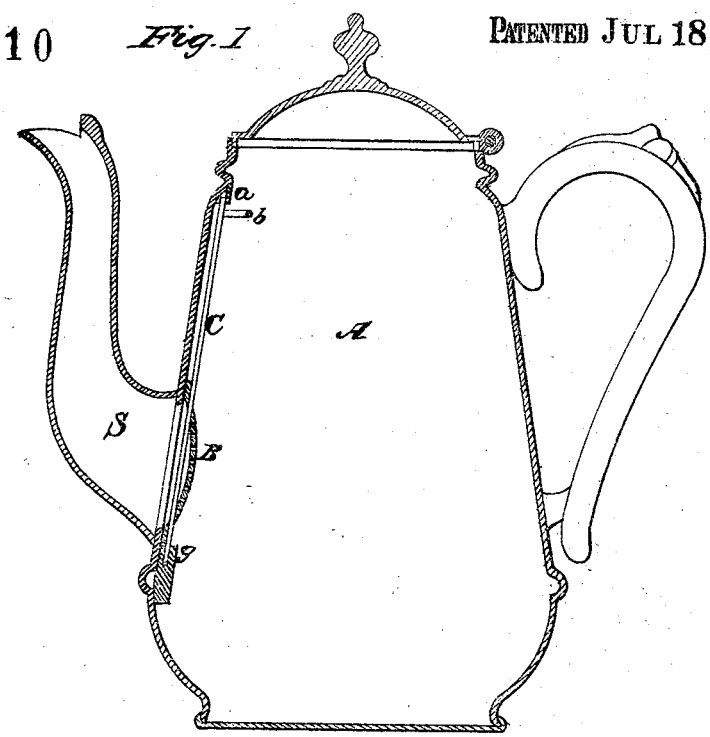
Fig. 2.
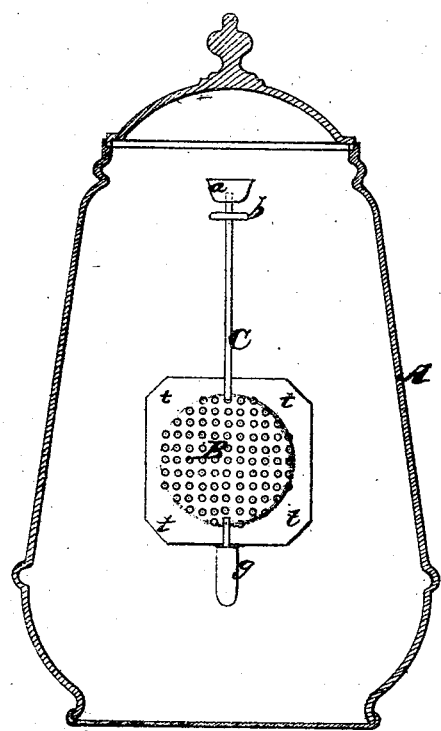
Fig. 3
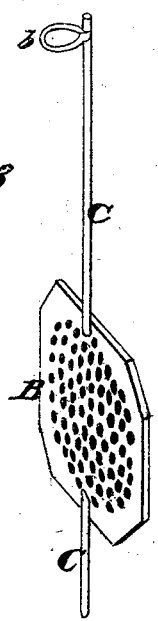
Witnesses.
F. S. Campbell.
J. N. Campbell.
Inventor
F. I. Sage
by
Munn, Fenwick & Lawrence

UNITED STATES PATENT OFFICE.

FRANKLIN I. SAGE, OF CROMWELL, CONNECTICUT.

IMPROVEMENT IN COFFEE-POTS.

Specification forming part of Letters Patent No. 117,210, dated July 18, 1871.

*To all whom it may concern:*

Be it known that I, FRANKLIN I. SAGE, of Cromwell, in the county of Middlesex and State of Connecticut, have invented a new and Improved Coffee and Tea-Pot Strainer; and I do hereby declare that the following is a full, clear, and exact description thereof, reference being had to the accompanying drawing making part of this specification, in which—

Figure 1 is a diametrical section through a coffee and tea-pot having my improved strainer applied to it. Fig. 2 is a diametrical section through the coffee and tea-pot taken at right angles to the plane of the section of Fig. 1, showing the strainer in place. Fig. 3 is a perspective view of the strainer.

This invention relates to an improved mode of applying strainers to coffee and tea-pots which are made of Britannia metal, whereby this metal will not be bulged out or rendered unsightly at the point where the strainers are applied, as will be hereinafter explained.

The following is a full and clear description of my invention:

In the accompanying drawing, A represents the body of a coffee and tea-pot, which is made of thin Britannia metal in the usual well-known manner. B represents a concavo-convex perforated strainer, which is made of a thin sheet metal and secured fast to a rod, C. This rod C is passed through the bulging portion of the strainer, so that its imperforated flanges $t\ t$ may fit snugly in contact with the inner surface of the pot A around the opening leading into the spout S. A portion of the rod C extends below the strainer B, and is received into a socket-piece, $g$, which is secured permanently to the pot A. The upper end of the rod C is received into a groove which is formed in a lip, $a$, secured to the pot near its top. The rod C is bowed a little and has a ring-handle, $b$, secured to it near its upper end by which to remove and insert the rod and strainer. To remove the strainer the upper end of rod C is pressed backward and to one side and drawn out of its socket $g$.

Removable strainers have been applied to Britannia pots before my invention, by sliding the strainers between lips which were secured on the inner sides of the pots. This is very objectionable, for the reason that when the Britannia metal is warmed it becomes soft, and the outward pressure of the strainers bulges out the metal and exposes unsightly ridges and marks on the outer surfaces of the pots. This objection is effectually removed by my invention, as the strainer B is only gently pressed against the pot by the spring action of the rod C, which rod is held at both extremities as set forth.

Having described my invention, what I claim as new, and desire to secure by Letters Patent, is—

The combination, with a Britannia metal pot, A, of a strainer, B, applied to a rod, C, which is held in place at its extremities by pieces $a$ and $g$, substantially as described.

FRANKLIN I. SAGE.

Witnesses:
WILLIAM S. STICKNEY,
CHRISTINE L. STICKNEY.